(12) United States Patent
Otten

(10) Patent No.: US 11,388,347 B2
(45) Date of Patent: Jul. 12, 2022

(54) LED DRIVER AND METHOD OF OPERATING A CAMERA

(71) Applicant: ELDOLAB HOLDING B.V., Son en Breugel (NL)

(72) Inventor: Andy Johanna Elisabeth Otten, Wassenberg (DE)

(73) Assignee: eldoLAB Holding B.V., Son en Breugel (NL)

( * ) Notice: Subject to any disclaimer, the term of this patent is extended or adjusted under 35 U.S.C. 154(b) by 48 days.

(21) Appl. No.: 17/059,840

(22) PCT Filed: Jun. 3, 2019

(86) PCT No.: PCT/NL2019/050321
§ 371 (c)(1),
(2) Date: Nov. 30, 2020

(87) PCT Pub. No.: WO2019/231330
PCT Pub. Date: Dec. 5, 2019

(65) Prior Publication Data
US 2021/0227120 A1   Jul. 22, 2021

(51) Int. Cl.
*H04N 5/235* (2006.01)
*H04B 10/116* (2013.01)

(52) U.S. Cl.
CPC ......... *H04N 5/2354* (2013.01); *H04N 5/2351* (2013.01); *H04B 10/116* (2013.01)

(58) Field of Classification Search
CPC .. H04N 5/2354; H04N 5/2351; H04N 5/2256; H04N 5/23245; H04N 5/3532; H04B 10/116; C01B 32/384; C01B 32/372; G03B 15/05; G03B 9/36
See application file for complete search history.

(56) References Cited

U.S. PATENT DOCUMENTS

| | | | | |
|---|---|---|---|---|
| 2013/0266325 | A1* | 10/2013 | Giustiniano | H04B 10/116 398/130 |
| 2014/0078278 | A1 | 3/2014 | Lei | |
| 2015/0311977 | A1* | 10/2015 | Jovicic | H04B 10/691 398/106 |

(Continued)

FOREIGN PATENT DOCUMENTS

WO    2017155410 A1    9/2017

OTHER PUBLICATIONS

Search Report and Written Opinion for International Application No. NL 2021044, dated Feb. 12, 2019 (9 pages).

(Continued)

*Primary Examiner* — Chiawei Chen
(74) *Attorney, Agent, or Firm* — RatnerPrestia

(57) ABSTRACT

Disclosed is a method of capturing an image of a scene using a user device having a rolling shutter camera. The scene is subjected to an illumination by an LED light source. The method includes providing, by the user device, a notification signal to the LED light source, the notification signal being indicative of a capturing or imminent capturing of an image; adjusting, by the LED light source, an operating characteristic of the LED light source, based on the notification signal; and capturing, by the rolling shutter camera, the image of the scene, while the LED light source is operating at the adjusted operating characteristic.

24 Claims, 10 Drawing Sheets

(56) References Cited

U.S. PATENT DOCUMENTS

| | | | |
|---|---|---|---|
| 2016/0248971 A1* | 8/2016 | Tall | H04N 5/2329 |
| 2017/0099104 A1* | 4/2017 | Kuraki | H04B 10/116 |
| 2017/0206417 A1* | 7/2017 | Aoyama | G06V 20/20 |
| 2017/0286792 A1 | 10/2017 | Ackerman et al. | |
| 2018/0041681 A1 | 2/2018 | Pope et al. | |
| 2018/0227051 A1* | 8/2018 | Shim | G01J 1/0271 |
| 2019/0036646 A1* | 1/2019 | Kato | H04L 1/0048 |
| 2019/0297243 A1* | 9/2019 | Oshima | H04N 5/2353 |
| 2019/0363794 A1* | 11/2019 | Kuraki | H04B 10/502 |

OTHER PUBLICATIONS

Written Opinion for International Application No. PCT/NL2019/050321, dated Sep. 19, 2019 (6 pages).

* cited by examiner

US 11,388,347 B2

LED DRIVER AND METHOD OF OPERATING A CAMERA

RELATED APPLICATIONS

This application is a U.S. National Phase Patent Application of International Application No. PCT/NL2019/050321, filed Jun. 3, 2019, which claims priority to Netherlands Application No. NL 2021044, filed Jun. 1, 2018, the disclosures of which also are entirely incorporated herein by reference for all purposes.

FIELD OF THE INVENTION

The invention relates to the field of photography, in particular to the field of capturing images of objects that are illuminated by light sources such as LED based light sources, by means of digital cameras as can e.g. be found in handheld user devices such as smartphones.

BACKGROUND OF THE INVENTION

The present invention relates to the field of digital cameras which apply a flash light during the capturing of a picture or image. Digital cameras are nowadays widely used, e.g. in handheld user devises such as smartphones or the like. When used indoors, the capturing of a picture is often combined with the use of a flash or flash light to provide additional illumination to the subject of the picture or image. In addition, the subject of the picture may also be illuminated by other light sources. As an example, paintings in a museum may be illuminated by designated light sources, e.g. including LED light sources. Compared to conventional light bulbs in which wire filaments are heated or halogen light sources, the illumination as provided by LED light sources need not be continuous. Typically, LED light sources are operated to generate a desired illumination characteristic, e.g. a desired colour and/or intensity by applying a modulated current to one or more LEDs or LED groups. Such a modulated current will result in a corresponding modulation of the intensity of the light that is generated.

However, the modulation of the current will typically occur at a sufficiently high frequency such that the corresponding modulation of the intensity of the light will not be perceived by a human observer. Such a modulation may e.g. occur when a dimming of the light source is required or when the light source is used for visible light communication (VLC).

As a result of the modulation of the light however, the instantaneous illumination of an object or subject that is to be captured by a camera will vary over time, albeit at a comparatively high frequency. As a result, the illumination applied to an object or subject will depend on the instant at which the picture is captured. This may result in unwanted or undesired effects, in particular when a rolling shutter camera is used.

It can further be pointed out that similar issues may occur when images are captured using cameras that have a normal shutter, also referred to as a global shutter. Such cameras may typically perform measurements prior to the capturing of an image, such measurements aiming to derive optimal iris and focus settings for the camera. However, when the illumination conditions as perceived during the measurements are different from the illumination conditions during the actual capturing of the image, the derived iris and focus settings may not be optimal.

SUMMARY OF THE INVENTION

It would be desirable to provide in improved methods of capturing images and to provide in improved light sources enabling such methods. In particular, it would be desirable to provide in improved methods of capturing images and to provide in improved light sources enabling such methods when a rolling shutter camera is used.

To better address one or more of these concerns, in an aspect of the invention, a method of capturing an image of a scene using a user device having a rolling shutter camera, the scene being subjected to an illumination by an LED light source, the method comprising:
  providing, by the user device, a notification signal to the LED light source, the notification signal being indicative of a capturing or imminent capturing of an image;
  adjusting, by the LED light source, an operating characteristic of the LED light source, based on the notification signal;
  capturing, by the rolling shutter camera, the image of the scene, while the LED light source is operating at the adjusted operating characteristic.

According to another aspect of the invention, there is provided a method of capturing an image of a scene using a user device, the scene being subjected to an illumination by an LED light source, the method comprising:
  providing, by the user device, a notification signal to the LED light source, the notification signal being indicative of a capturing or imminent capturing of an image;
  adjusting, by the LED light source, an operating characteristic of the LED light source, based on the notification signal;
  capturing the image of the scene by the user device while the LED light source is operating at the adjusted operating characteristic.

According to another aspect of the present invention, there is provided an LED driver for powering an LED based light source, the LED driver comprising:
  a power converter configured to convert a supply power to an output power for the LED based light source;
  a control unit configured to:
  receive an input signal representing a desired illumination;
  control the output power so as to generate the desired illumination;
  receive a notification signal from a user device, the notification signal indicative of a capturing or imminent capturing of an image;
wherein the control unit is further configured to, upon receipt of the notification signal, adjust an operating characteristic of the power converter, at least during the capturing of the image, thereby operating the LED based light source at an adjusted illumination.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
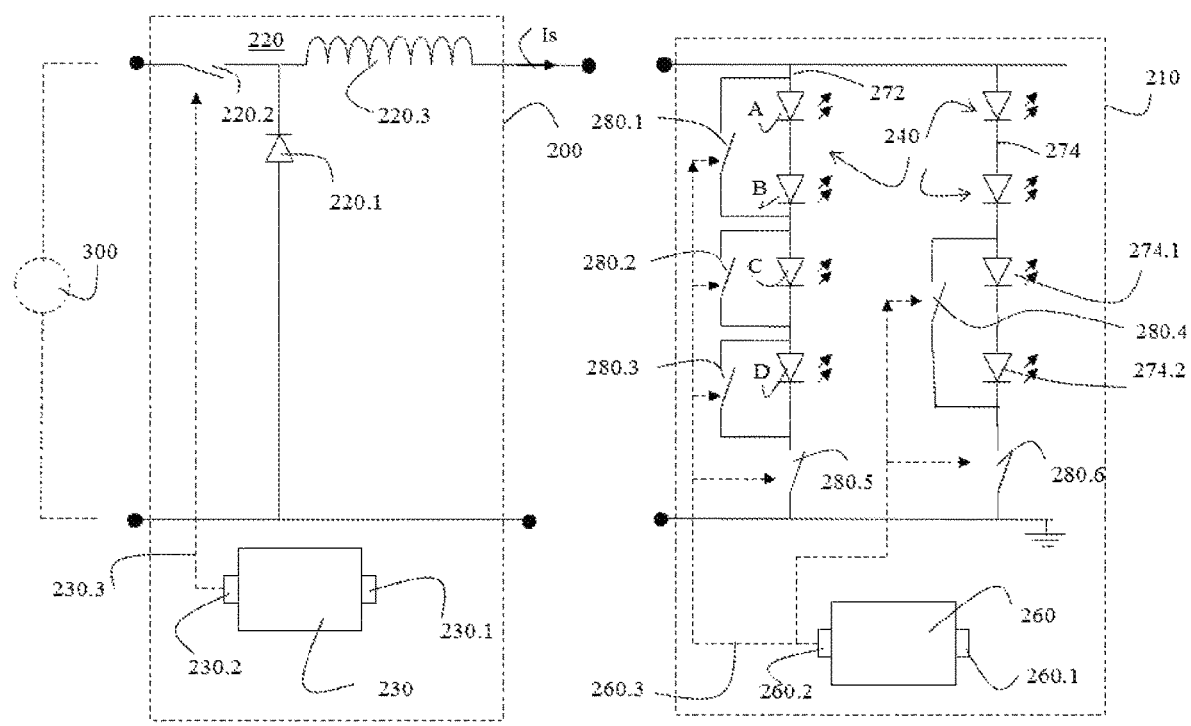
FIG. 1 depicts an LED light source according to an embodiment of the present invention.

FIG. 1 depicts an LED light source according to an embodiment of the present invention. In the embodiment as shown, the LED light source as schematically shown comprises a first component 200, i.e. an LED driver and a second component 210, i.e. a light engine. In the embodiment as shown, the LED light source can be considered a modular system. Within the meaning of the present invention, a modular system refers to a combination of components or systems of a lighting application that are typically manufactured as separate items and assembled later on to form the lighting application. Embodiments of the modular systems according to the present invention e.g. comprise LED drivers, light engines and optionally interface modules as such components or items.

It should however be pointed out that the present invention is not limited to modular systems or modular lighting systems. As such, in an embodiment, the LED driver 200 and the light engine 210 may be integrated.

Within the meaning of the present invention, light engine refers to an LED assembly comprising a plurality of LEDs. In an embodiment, some or all of the LEDs of the LED assembly are arranged in groups forming LED groups. In an embodiment, each of the LEDs or LED groups is accessible via a terminal of the light engine, 'being accessible' referring to the light engine being connectable to an LED driver or interface module, in order to supply a power to the LEDs or LED groups. In an embodiment, a light engine refers to a combination of an LED assembly and associated switches, the switches being configured to control a current through the LEDs of the LED assembly. In general, the LED assembly may comprise a plurality of LEDs arranged in a variety of topologies. Further, the topology of the LEDs of the LED assembly may also be adjustable by means of switches, thereby e.g. changing a topology of two LEDs connected in series to a topology whereby the LEDs are connected in parallel.

In accordance with an embodiment of the present invention, a light engine may further comprise a control unit or controller for controlling an operating state of the switches of the light engine. Such a control unit or controller may e.g. be embodied as a processor such as a microprocessor or the like.

Within the meaning of the present invention, an LED driver comprises one or more switched mode power converters (SMPC) and a control unit for controlling the one or more switched mode power converters, in particular for controlling a switch, but not limited to, of the switched mode power converter or converters.

In the embodiment as shown, the LED driver 200 comprises a switched mode power converter (SMPC) 220 and a first control unit 230 for controlling the switched mode power converter (SMPC).

In accordance with the present invention, various switched mode power converters may be applied such as Buck, Boost, Buck-Boost, sepic, fly-back or hysteretic converters. In the embodiment as shown, the SMPC is a Buck converter 220 including a diode 220.1 a power switch 220.2 and an energy storage element 220.3, i.e. an inductance. Typically, such converters comprise a switch such as switch 220.2 as shown, for controlling an output current Is as supplied by the SMPC. In an embodiment, the SMPC 220 may e.g. be powered via a rectified DC supply voltage 300.

In the embodiment as shown, the light engine 210 is a separate component comprising an LED assembly 240, a plurality of switches 250 for controlling whether or not a current flows through the LEDs and a control unit 260 for controlling the switches. In the embodiment as shown, the LEDs of the LED assembly 240 are arranged in two parallel branches 272, 274. The first branch 272 comprises three groups (group 1 comprising LEDs A and B, group 2 comprising LED C and group 3 comprising LED D) that are arranged in series, each group further having an associated switch 280.1, 280.2, 280.3 for controlling the current through the LED group. The LED assembly further comprises a second branch 274 comprising 4 LEDs, whereby LEDs 274.1 and 274.2 can be shorted by switch 280.4. Switches 280.5 and 280.6 control whether or not a current can be supplied to the respective branches 272 and 274.

In accordance with an aspect of the present invention, the controlling of the SMPC, i.e. the power converter 220 of the LED driver 200 and of the switches 280.1-280.6 as applied in the light engine 210 is performed by separate control units.

Within the meaning of the present invention, a control unit or controller may e.g. be embodied as a microprocessor or processor or any other type of control circuitry. In general, such a control unit may comprise an input terminal 230.1, 260.1 for receiving command signals such as a user defined illumination set point, i.e. an input signal (e.g. provided via a user interface) representing a desired illumination characteristic of the LED assembly. In an embodiment, such a desired illumination characteristic may e.g. include a desired intensity and a desired colour of the light as generated by the LED assembly of the light engine or a certain ratio between the intensities or colours of multiple channels or branches, or a dynamic sequence of such ratios, e.g. resulting in a light show. A control unit or controller may further comprise a processing unit for processing the commands or input signals and e.g. a memory unit for storage of data. A control unit or controller further typically has one or more output terminals 230.2, 260.2 for outputting control signals, e.g. for controlling an electronic switch of the SMPC (indicated by the dotted line 230.3) or controlling a switch of the light engine (indicated by the dotted line 260.3).

In a system as schematically shown in FIG. 1, a desired illumination characteristic to be emitted by the LEDs of the LED assembly 240 can be realized as follows:

In order to realize a desired illumination characteristic, e.g. a particular colour at a particular intensity, the current as provided by the SMPC 220 can be modulated, i.e. the amplitude can be adjusted and the duty cycle of the current through the different LEDs or LED groups of the LED assembly can be adjusted, by switching of the switches 280.1 to 280.6.

In such embodiment, the control unit 230 thus controls the SMPC 220, thereby controlling the amplitude of the supply current Is as provided by the LED driver to the light engine, whereas the control unit 260 may be configured to control the switches 280.1 to 280.6.

In general, the light as generated by an LED light source, e.g. an LED light source as schematically shown in FIG. 1, may thus be discontinuous or modulated, i.e. the intensity and/or color may not be the same at all instants. Because these intensity variations typically occur at comparatively high frequencies, these variations are not observed by a human observer.

Modulations or variations of the current may not only relate to the generation of a particular illumination set point, they may also be caused by operating the LED light source in a VLC mode, i.e. a visible light communication mode.

In a visible light communication method, the light as generated by a light source is modulated, whereby the applied modulation represents data, which can be retrieved from the modulated light, e.g. by a user device equipped with a sensor that captures the modulated light. In general, there are various ways to modulate the light as generated by the light source, whereby the modulation or modulated light represents particular data. As an example, data may be coded by using light pulses of different duration. By e.g. using a set of 7 symbols, each symbol being represented by a light pulse of a particular duration, one can combine two or more of such symbols to represent particular data. Alternatively, a symbol used to code data may be characterized by having a particular duration or period, whereby said period comprises a sub-period during which a comparatively high intensity is generated, followed by a sub-period during which a comparatively low intensity is generated. When such a modulation is applied, a user device equipped with an intensity sensor may determine or measure the duration of the emitted symbols by observing when the intensity as received changes from a low intensity to a high intensity as these transition indicated the end of a symbol and thus the beginning of a next symbol.

Figure 2:
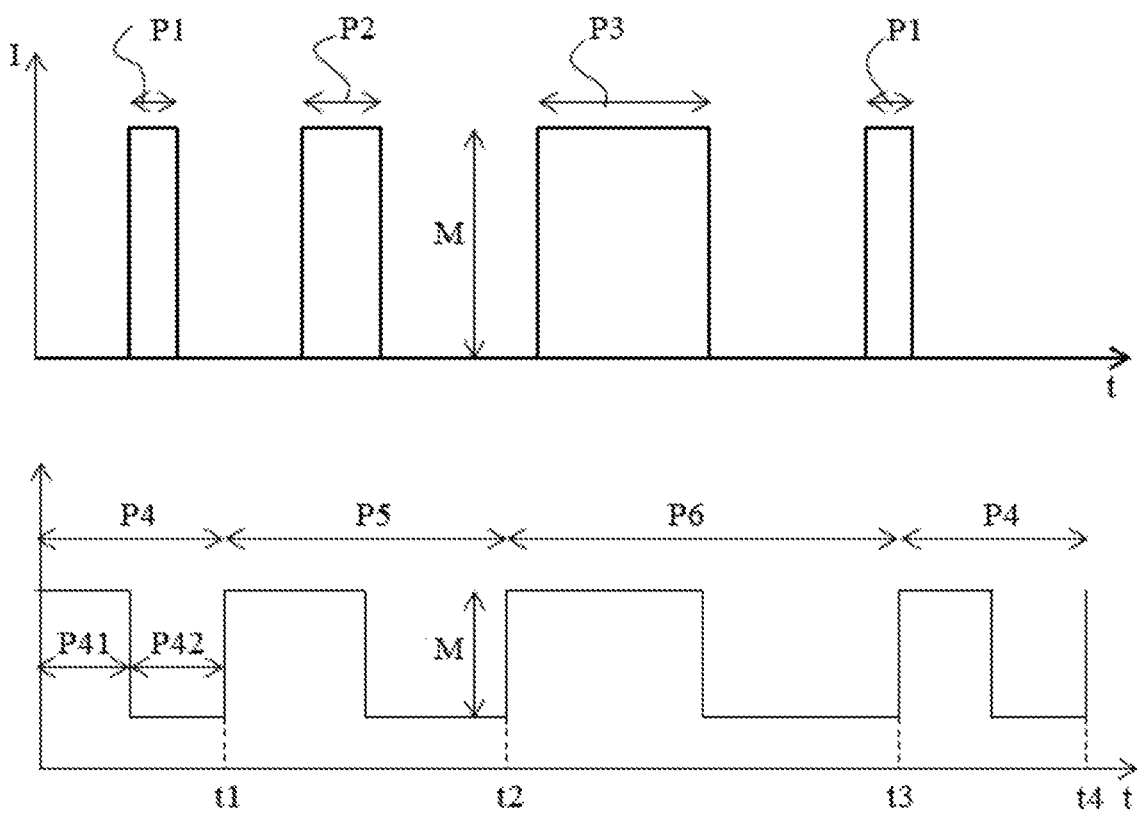
FIG. 2 schematically depicts two modulated intensity patterns as can be generated by an LED based light source.

FIG. 2 schematically illustrates the aforementioned two possible manners to modulate an intensity of a light source, the modulation representing a sequence of symbols used to code particular data.

FIG. 2 (*a*) schematically shows a pulsed intensity variation I(t), whereby a length or duration of the pulses P1, P2, P3 represents a particular symbol. As such, when the intensity I is modulated as shown in FIG. 2 (*a*), this may represent the transmission of a sequence P1, P2, P3, P1. Typical examples of durations P1, P2 or P3 as applied to generate particular symbol may e.g. be in a range of 200-700 μsec. By doing so, one may e.g. generate 6 different symbols having respective durations of 200, 300, 400, 500, 600 and 700 μsec. Code words may then be formed by a particular combination of n symbols, e.g. n=7.

FIG. 2 (*b*) schematically shows an alternative manner to code symbols or particular data. In the alternative manner, a symbol is characterized by its duration, whereby each symbol may be characterized by having a particular duration or period P4, P5, P6, whereby said period comprises a sub-period, e.g. P41, during which a comparatively high intensity is generated, followed by a sub-period, e.g. P42, during which a comparatively low intensity is generated. When such a modulation is applied, a user device equipped with an intensity sensor may determine the duration of the emitted symbols by observing when the intensity as received changes from a low intensity to a high intensity as these transitions, e.g. occurring at instants t1, t2, t3, t4, indicated the end of a symbol and thus the beginning of a next symbol. As such, when the intensity I is modulated as shown in FIG. 2 (*b*), this may represent the transmission of a sequence P4, P5, P6, P4. In the shown examples of modulating an intensity of light generated by a light source, the difference between the maximum intensity and the minimum intensity may be referred to as the modulation depth M. In general, the decoding of the modulated light into symbols or particular data will be facilitated by having a comparatively large modulation depth M. Note that the modulation depth M may also be expressed as the intensity difference over the maximum intensity, e.g. expressed as a percentage.

In case a light source, e.g. an LED based light source that is used to illuminate an object or scene, is used for visible light communication (VLC) and an observer wishes to capture an image of the object or scene, the image capturing device or camera may observe, during the capturing of the image, the varying illumination conditions caused by the VLC process. As a result, in particular when a rolling shutter camera is used, the captured image may be affected by the modulations or variations in the applied illumination.

Figure 3:
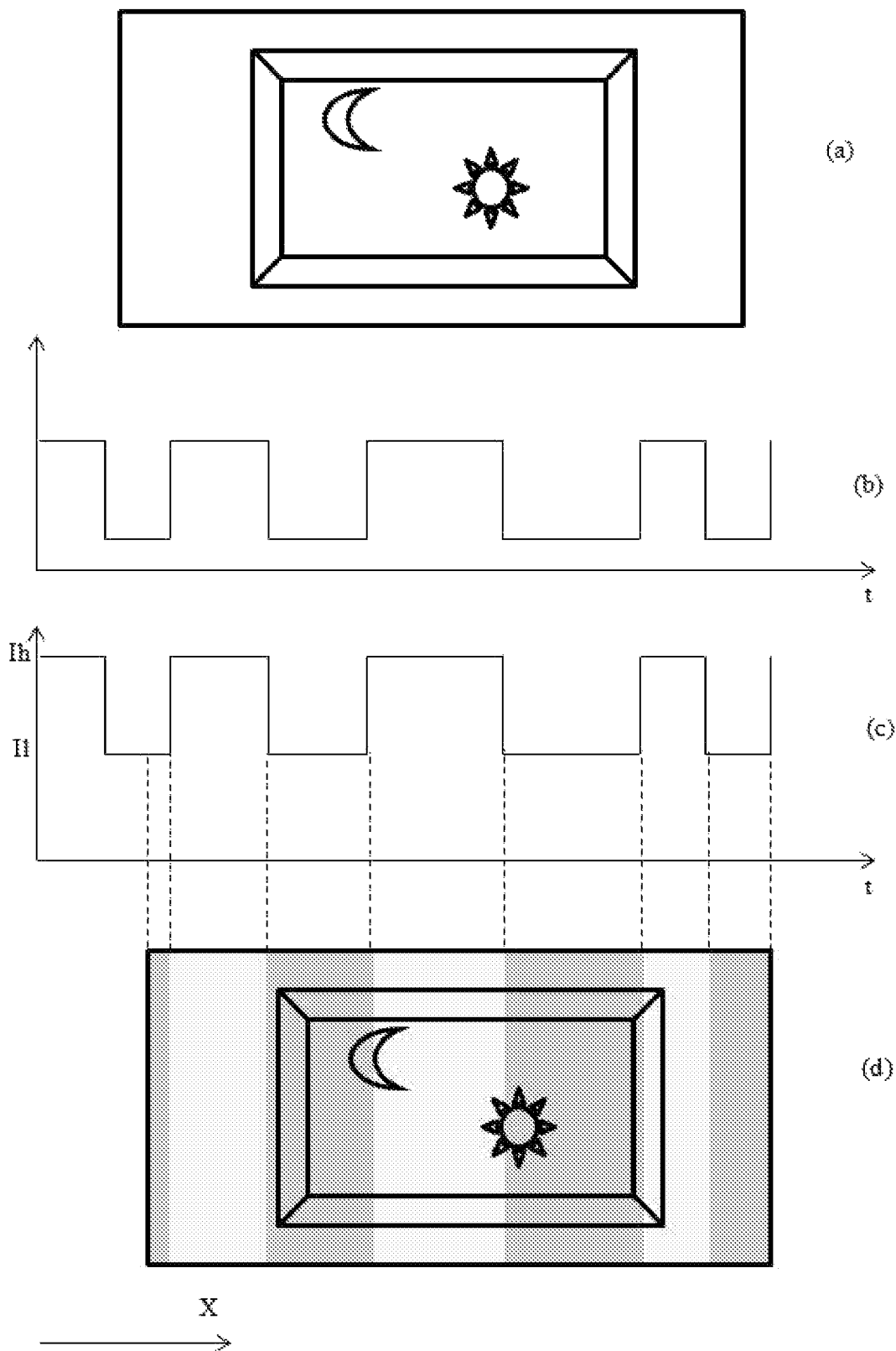
FIG. 3 illustrates the capturing of an image using a rolling shutter camera when a scene is illuminated with a modulated intensity pattern.

This is illustrated in FIG. 3.

FIG. 3 (*a*) schematically illustrates an image to be captured. FIG. 3 further schematically illustrates, in a first graph (b), a current I as supplied to an LED based light source applied to illuminate an object. The modulations of the current may e.g. be due to an operation in a dimming mode or due to an operation in a VLC mode.

FIG. 3 further schematically illustrates, in a second graph (c), the associated illumination of the object, e.g. including daylight illumination.

FIG. 3 (*d*) schematically illustrates a resulting image obtained when the image, e.g. an image of a painting in a museum, is captured using a user device comprising a rolling shutter camera during the period P0 starting at t=t0 and ending at t=t1. It is assumed that the rolling shutter camera captures the entire image during the period P0, whereby the rolling shutter moves in the X-direction.

The operation of a rolling shutter camera is assumed to be well known; by means of a rolling shutter, the capturing of an image occurs by scanning a scene either vertically, horizontally or at any angle with respect to the camera sensor; i.e. not all parts of an image are captured or recorded at the same time. As a result, as can be seen in FIG. 3 (*d*), certain portions of the image, e.g. portions that are captured when the illumination of the scene is comparatively high, e.g. equal to Ih, whereas certain other portions of the image, e.g. portions . . . are captured when the illumination of the scene is comparatively low, e.g. equal to Il.

As can be seen, due to the temporal variation of the illumination of the subject, a non-uniform unwanted intensity variation is obtained in the image. Such an unwanted intensity variation, e.g. resulting in the occurrence of vertical or horizontal stripes or bars in the image, may be referred to, in the present invention as illumination artefacts.

As will be clear from the above example involving the use of a rolling shutter camera, the application of a modulated, in general a temporarily varying, illumination may adversely affect the result of an image capturing process.

It may be pointed out that such a temporarily varying illumination may also cause adverse or unwanted effects when a more conventional camera is used, such camera comprising a conventional shutter, also referred to as a global shutter.

Such cameras, like rolling shutter cameras, may perform, prior to the capturing of an image, measurements, in particular intensity measurements of the available illumination, in order to determine image capturing parameters such as iris and focus settings. In case, as e.g. illustrated above, a temporarily varying illumination is available, e.g. due to pulse width dimming or the operation in VLC mode, the illumination conditions during the measurements may be different than the illumination conditions during the capturing of the image. As can be understood, in case the illumination conditions during the measurements are different than the illumination conditions during the capturing of the image, the derived iris or focus settings may not be optimal.

It can further be pointed out that typical shutter speed settings as available on cameras may e.g. include 1/500 sec, 1/250 sec, 1/125 sec, etc.

Comparing such shutter times with e.g. the modulation periods or durations used when LED light sources are operated in dimming modes or VLC modes, one can deduce that the modulations as applied may result in observable modulations in the illumination during the capturing of an image.

The present invention provides in various manners to anticipate on such a varying illumination of a subject during the capturing of an image.

In an embodiment of the present invention, a method of capturing an image of a subject is provided, whereby an operating characteristic of a light source illuminating the subject is temporarily adjusted, e.g. during the capturing of the image.

Figure 4A:
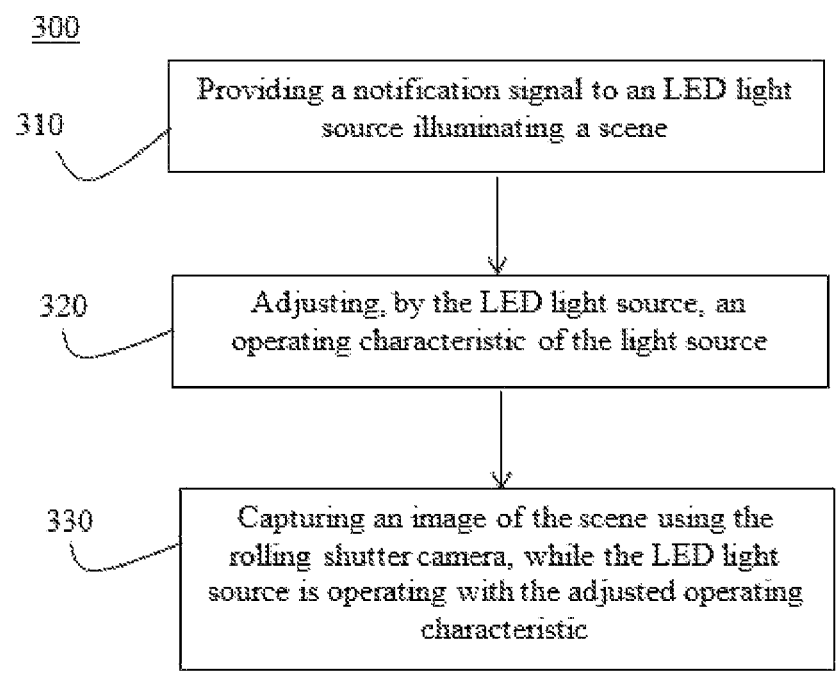
FIG. 4a depicts a flowchart of a method according to the present invention.

FIG. 4a schematically shows a flowchart of an embodiment 300 of a method of capturing an image of a subject or scene using a user device comprising a rolling shutter camera, according to the present invention.

The embodiment of the method according to the invention as illustrated in FIG. 4a relates to a method of capturing an image of a subject using a camera or user device that uses a rolling shutter camera, whereby the subject is illuminated by a modulated LED light source.

In the illustrated embodiment, the method comprises a first step 310 of providing, by the rolling shutter camera, a notification signal to the LED light source.

By doing so, the LED light source can be made aware, i.e. notified that a user of the rolling shutter camera wishes to capture an image.

In an embodiment, such a notification signal may be provided in various manners to the LED light sources, depending on the available modes of communicating with the LED light source. In an embodiment, the notification signal may be provided to the LED light source by means of wireless communication, e.g. using Bluetooth, Wi-Fi, VLC or audio.

In an embodiment, the application of a flashlight by the camera or camera device may be considered a notification signal that is provided to the LED light source. In order to detect such a notification signal, the LED light source may be equipped with a light sensor, e.g. an ambient light sensor. Such a sensor may e.g. provide a signal representative of the ambient illumination to a control unit of the LED driver. Such a control unit may, upon receipt of such a signal, assess when a flashlight is applied in the vicinity of the LED based light source.

The application of a flashlight in the vicinity of the LED based light source may e.g. be detected when a sudden increase, shortly followed by a sudden decrease in intensity is observed by the ambient light sensor of the LED light source.

In the embodiment as illustrated, the method further comprises a second step 320 of adjusting, by the LED light source, an operating characteristic of the LED light source, based on the notification signal.

In accordance with an embodiment of the present invention, the LED light source used to illuminate a subject that is to be captured by a camera, may adjust an operating characteristic, when notified, by the notification signal, that a user intends to capture an image of the subject that is illuminated. In particular, in an embodiment, the LED light source may be configured to adjust an operating characteristic so as to mitigate the effects of the applied illumination of the subject on the image as captured.

In an embodiment, the measures taken by the LED light source, i.e. the adjustment of the operating characteristic, may depend on the operating mode of the LED light source.

As an example, the LED light source may be operating in a duty ratio or duty factor dimming mode, whereby a light source, e.g. an LED based light source is operated at a particular duty ratio or duty factor in order to obtain the desired dimming level. Within the meaning of the present invention, duty ratio or duty factor can refer to the percentage of ON time (or OFF time) of the LED based light source, during a particular period. Within the meaning of the present invention, this duty ratio or duty factor need not remain constant but may be varied, as well as the period during which the duty factor or duty ratio is applied. As an example of such a dimming mode, pulse width modulation (PWM) can be mentioned. When operating in a duty ratio or duty factor dimming mode, the intensity of the generated light will vary in accordance with the applied duty ratio or duty factor. In an embodiment of the present invention, the LED light source may be configured to apply a different dimming mode, e.g. a dimming mode in which a substantially constant current is supplied to the LED fixture, rather than a pulsed current. Such an adjustment of the applied dimming mode may e.g. be triggered by the receipt of a notification signal as discussed.

As another example, the LED light source may be operating in a VLC mode, whereby data is transmitted by means of visible light communication (VLC), a communication method relying on the application of modulations in the intensity of the emitted light. When operating in such a VLC mode, the LED light source may be configured to, upon receipt of the notification signal stop the VLC communication, either for a predetermined period of time, or until a further notification signal is received.

In general, the notification signal as received by the light source may trigger the light source to adjust an operating characteristic, e.g. a dimming mode or VLC transmission mode such that the capturing of the image can take place while the light source is not generating a modulated illumination or is generating illumination with a smaller, less disturbing modulation. In order to realize that, the notification signal may contain a parameterized time or duration during which the adjusted operating conditions need to be applied.

In an embodiment, such a parameterized time or duration may be stored in the LED based light source, e.g. in a lookup table, whereby the parameterized time or duration can be determined based on an ID or identifier that is emitted in the notification signal. The ID or identifier may e.g. be a time-ID in a predetermined list of times or periods, a smartphone type ID, a smartphone ID, a camera type ID, a venue ID, a room ID, etc.

In an embodiment where the LED light source relies on the receipt of a further notification signal to switch back to the initial or earlier operating mode, precautions may be taken for the situation where the LED light source does not receive or does not recognize the further notification signal. Such precautions may e.g. include that the LED light source returns back to the initial or earlier operating mode after a predetermined period, or that known handshake protocols with e.g. a number of retries upon a time out are used.

In the embodiment as illustrated, the method further comprises a third step 330 of capturing the image by the rolling shutter camera, while the LED light source is operating at the adjusted operating characteristic. In accordance with the method according to the present invention, an image may thus be captured while the LED light source is operating with an adjusted operating characteristic. By doing so, the effects of varying illumination conditions during the capturing of an image using a rolling shutter camera may be mitigated or alleviated.

In an embodiment, the notification signal as applied in the first step 310 as illustrated may be parameterized. In such embodiment, the notification signal may e.g. contain the duration that the adjusted illumination conditions should apply. As another example, the delay between the receipt of the notification signal and the actual start of the capturing of the image by the camera may be a parameter as well. Based on this delay, the light source may determine at which instant the operating characteristic should be adjusted.

It may be pointed out that a typical handheld user device such as a smartphone, tablet or the like may not be equipped to send a notification signal to the LED light source. An App may however be developed which enables to emit such a notification signal to the LED based light source. Such an App may e.g. be provided by the museum or venue where the image capturing is to take place. It can be pointed out that such an App may be configured to communicate with a camera App available on the user device, said camera App being configured to control the hardware of the user device when an image is to be captured. Alternatively, the App may be configured to contain camera or image capturing functionality as well, thus directly interacting with the hardware of the handheld device.

In an embodiment of the method according to the present invention, the step 310 as illustrated in FIG. 4a is preceded by the steps of:
  receiving, by the user device, an illumination signal of the LED light source; and
  establishing, by the user device, that the LED light source is operating in a VLC mode or the like.

In another embodiment, the step 310 as illustrated in FIG. 3 is preceding by the steps of:
  receiving, by the user device, an illumination signal of the LED light source; and
  establishing, by the user device, that the LED light source is operating in a pulsed dimming mode.

Figure 4B:
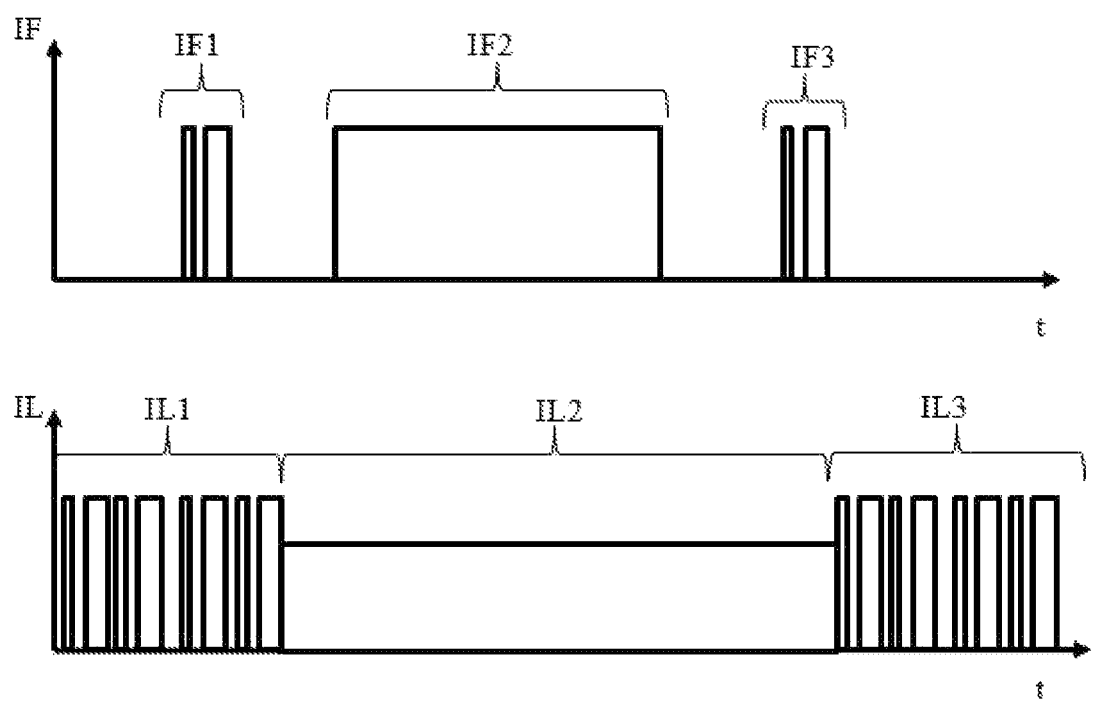
FIG. 4b depicts an illumination of a light source of a user device and an illumination of an LED based light source in the time-domain.

FIG. 4b schematically illustrates a possible implementation of the method according to the present invention, in the time domain. The top graph of the FIG. 4b schematically illustrates the illumination IF as generated by the user device, e.g. a flash light of a use device, as a function of time t, whereas the bottom graph schematically illustrates the illumination IL as generated by the LED light source. In the embodiment as shown, the illumination IF as generated during period IF1 can be considered a notification signal generated by the flashlight of the user device. Note that, prior to the period IF1, the LED light source is operating in a normal or nominal operating mode, e.g. a VLC operating mode. In the illustrated example, the LED light source is assumed to operate in a VLC operating mode during period IL1.

In the embodiment as shown, it is shown that, the illumination IL or illumination mode of the LED light source is changed, e.g. by an LED driver controlling the LED light source, upon receipt or detection of the notification signal emitted during period IF1. In particular, the illumination mode IL is changed, during a period IL2 to a continuous illumination mode. During said period IL2, the user device may be configure to capture an image, whereby, during the capturing of said image, the flash light is applied, resulting in an illumination of the flash light during a period IF2. Once the picture has been captured, the user device may be configured to emit a further notification signal, e.g. by means of the flash light emitting an illumination IF during the period IF3. In reply to such further notification signal being received or detected by the LED light source, e.g. by the LED driver controlling the LED light source, the LED light source may resume operating in the VLC mode, e.g. during period IL3.

The continuous illumination mode during period IL2 as generated by the LED light source may e.g. be established by supplying the LED light source with a continuous DC current with a fixed amplitude. In an embodiment, the DC current may be selected such that both the intensity and the color of the illumination IL as generated during the period IL2 substantially correspond to the intensity and color of the illumination IL as generated during the period IL1 or IL3, as perceived by a human observer.

As mentioned above, variations of the intensity as applied by an LED light source may have different causes; variations may be caused by operating in a dimming mode or may be caused by operating in a VLC mode. Note that other intensity variations such as changes in the desired illumination set point, which may be incidental, are not considered here.

It may however be pointed out that, in an embodiment, an LED light source according to the present invention may be configured to disregard, at least temporarily, the application of a new, different illumination set point, during the capturing process of an image. In such an embodiment, the LED light source may e.g. be configured to postpone the application of the new set point until the image capturing process has finished. In such an embodiment, the new illumination set point may e.g. be applied by the LED based light source when it resumes operating in the initial or earlier mode, e.g. a dimming or VLC mode.

In an embodiment of the present invention, the notification signal provided may depend on whether or not a particular operating mode of the LED light source is observed. As example, in case of dimming by means of e.g. PWM, the notification signal may trigger the LED based light source to operate, for a predetermined period of time, using a different or modified dimming mode.

In an embodiment, the capturing of the image of the subject, object or scene may involve operating the rolling shutter camera during a plurality of periods, thus capturing a plurality of images of the subject, object or scene sequentially. In case the illumination conditions of different images of the sequence of images are different, the user device which comprises the rolling shutter camera may be configured to process the sequence of images, in order to generate a modified image which does not have the illumination artefacts or wherein the illumination artefacts are at least mitigated. The capturing of a sequence of images by a rolling shutter camera may e.g. be characterized by a capturing rate or capturing duration, i.e. the number of images per unit of time that can be captured or the duration or period to capture an image.

In such embodiment, it may be advantageous to synchronize operations of the rolling shutter camera and the LED light source, whereby the modulations, i.e. intensity modulations of the LED based light source are adjusted in such manner that the sequence of images as captured enables the generation of a modified image which does not have the illumination artefacts or wherein the illumination artefacts are at least mitigated.

Figure 5:
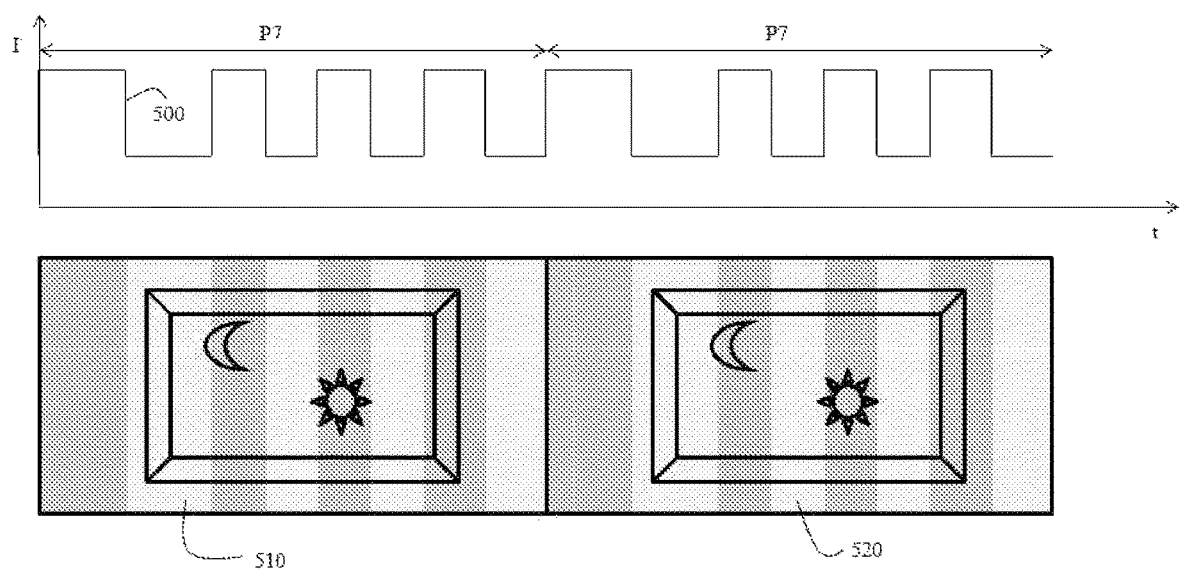
FIG. 5 illustrates the capturing of a sequence of images using a rolling shutter camera when a scene is illuminated with a modulated intensity pattern.

FIG. 5 schematically shows a hypothetical situation whereby an LED light source generates a modulated light pattern 500 during a period P7, said pattern e.g. representing a particular sequence of symbols, and whereby said modulated light pattern is continuously repeated in time t. For the given situation, it is further assumed that a rolling shutter camera is applied which captures a sequence of images 510, 520 at the same rate, i.e. one image per period P7. So the capturing duration, i.e. the time it takes to capture each of the images 510, 520 is P7 as well. As a result of the modulation, the images 510, 520 suffer from having illumination artefacts, as discussed above. Due to the pattern 500 being repeated at the same rate P1 as the images are captured, the images may be substantially identical. As a result, it would be difficult to remove the illumination artefacts by processing the sequence of images. In an embodiment of the present invention, the LED light source may be configured to adjust the light pattern so as to allow the rolling shutter camera to capture a sequence of images during different illumination conditions. Such an embodiment is schematically shown in FIG. 6.

Figure 6:
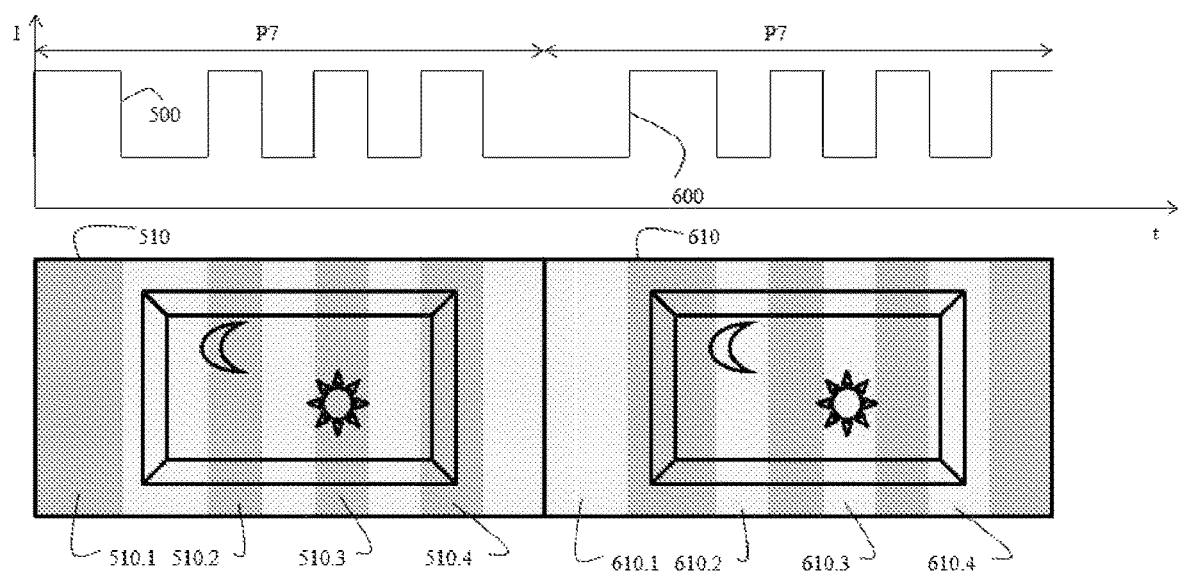
FIGS. 6 and 7 illustrate the capturing of a sequence of images using a rolling shutter camera when a scene is illuminated with a modulated intensity pattern and a modified modulated intensity pattern.

In FIG. 6, the LED light source is configured to generate a modulated light pattern 500 during a first period P7 and a modified modulated light pattern 600 during a second period P7, the modified modulated light pattern 600 being the inverse of the modulated light pattern 500. As a result, a sequence of images 510, 610 is obtained, whereby image 510 as shown in FIG. 6 corresponds to FIG. 510 of FIG. 5, while image 610 is obtained using the modified modulated light conditions 600. Since the modified modulated light pattern 600 is the inverse of the modulated light pattern 500 and the capturing of the images occurs in sync with the period P7, the darker portions of image 510, i.e. portions 510.1, 510.2, 510.3 and 510.4 substantial correspond to the brighter portions of image 610, i.e. portions 610.1, 610.2, 610.3 and 610.4. In such a situation, a modified image whereby the effect of the illumination artefacts is removed or mitigated may be obtained based on the images 510 and 610, e.g. by averaging the pixel values of the images.

As will be appreciated by the skilled person, alternative manners to ensure that the rolling shutter camera obtains a sequence of images which can be used to reconstruct an image in which the illumination artefacts are at least mitigated exist. As an example, the LED based light source as applied to illuminate the scene or object that is to be captured may e.g. adjust its modulation depth or adjust the modulated light pattern. In the latter case, the symbols transmitted (in case of operating in VLC mode) may be adjusted, the data rate may be adjusted, the transmission of VLC may temporarily be halted, etc. . . . by an appropriate modulation of the light as generated by the LED based light source. In this respect, it can be noted that a desired transmission of data using VLC may be temporarily disabled, delayed or rendered more difficult during the capturing of the image or sequence of images by the rolling shutter camera. However, when during the capturing of the image or images a flash light is used, the receipt or decoding of a VLC emitted code may be hampered anyhow. In that respect, it may be advantageous to ensure that the sequence of images that needs to be captured is as small as possible.

In the embodiment illustrated in FIG. 6, a synchronized operation of the rolling shutter camera and a transmitted VLC pattern is applied, whereby a modified modulated light pattern 600 was applied to enable the generation of an improved image based on a sequence of images.

Figure 7:
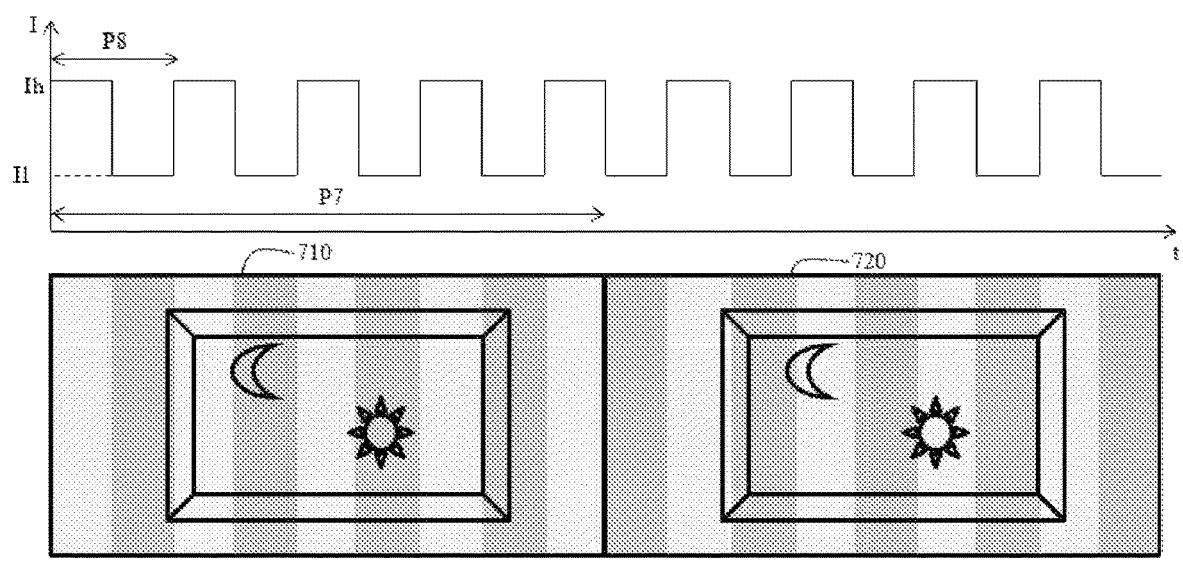

It can be pointed out that similar effects can be obtained by purposely selecting a duration or period of the modulated light pattern of the LED based light source, such that the image capturing duration or period does not correspond to an integer times the duration or period of the modulated light pattern of the LED based light source. By doing so, illumination artefacts as discussed above will occur at different positions in a sequence of images. When a sufficient number of images is captured, an image may be constructed from the sequence of images that does not contain any artefact or in which the effects of the artefacts are at least mitigated. This is schematically illustrated in FIG. 7. FIG. 7 schematically illustrated an intensity variation I as a function of time as can be obtained with an LED based light source operating in a dimming mode. The depicted intensity modulation can be characterized by a period P8 of the modulation and a duty cycle of the modulation. In the example given, an LED based light source is considered to operate at a 50% duty cycle with a period P8. The lower intensity Il can e.g. be considered an intensity of available daylight illumination. As further illustrated, the capturing of an image, e.g. image 710 or image 720, takes a period of time P7. In the embodiment as shown, the period P7 is not a multiple of the period P8, Rather, in the shown example, P7=4.5×P8. As a result, as can be seen when comparing images 710 and 720, the light pattern received during the capturing of image 720 is the inverse of the light pattern received during the capturing of image 710. As such, based on both images, a user device comprising the rolling shutter camera may be equipped to compile an improved image, in which the illumination artefacts are reduced. It can be pointed out that the applied example also relies on the application of a 50% duty cycle. In case the LED based light source would be operating at a different duty cycle, e.g. 33%, one can obtain a similar result by selecting P8 to comply to P7=4.33×P8 and using three images captured in sequence. Alternatively, the operating characteristic of the LED based light source may be modified in such manner that a lower intensity Ih is generated which may be combined with a 50% duty cycle.

In general, one can obtain the above described effect by selecting P8 such that it complies with:

$P7=a*P8+P8/b,$

Whereby a, b=integer numbers

By selecting P8 accordingly, the capturing of b images will result in the required sequence of images.

Figure 8:
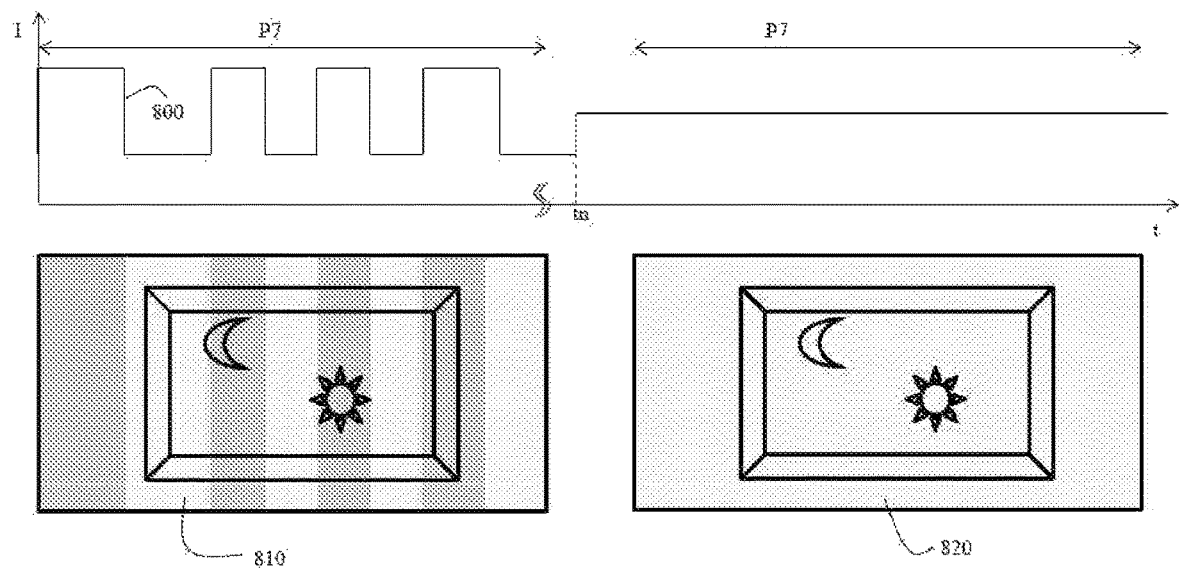
FIG. 8 illustrates the capturing of an image by a rolling shutter camera when an LED based light source is operating in pulsed mode and in continuous mode.

In an embodiment of the present invention, an LED based light source is configured to change an operating parameter after receipt of a notification signal. Such a change in operating parameter can e.g. include changing an operating mode from a pulsed operating mode (e.g. pulsed dimming mode or VLC mode) to a continuous current mode, i.e. an operating mode whereby the illumination as generated by the light source is substantially continuous, i.e. without intensity modulations. FIG. 8 schematically illustrates a transition of operating in a pulsed mode to operating in a constant current mode and the effect of it on the capturing of an image using a rolling shutter camera.

FIG. 8 schematically illustrates in a top graph an illumination intensity I, e.g. a combination of an ambient light illumination and a modulated or pulsed illumination 800, e.g. caused by an LED based light source. In the embodiment as shown, the LED based light source is assumed to generate the pulsed illumination until tn, an instant at which the light source, e.g. an LED driver controlling the light source, receives a notification signal. Upon receipt of the notification signal, the light source changes its generated illumination to a substantially continuous illumination, e.g. by switching from a pulsed current mode to a continuous current mode. The bottom portion of FIG. 8 illustrates the capturing of an image 810 by a rolling shutter camera during a period P7, when the LED based light source is still operating in pulsed mode, and the capturing of an image 820, when the LED based light source operates in a continuous mode. As can be seen, image 820 no longer contains the illumination artefacts that are visible in image 810.

As discussed above, the present invention may also be advantageously applied to improve the capturing of images by means of a camera having a conventional shutter or global shutter, in particular in case said camera applies a flash to set certain image capturing parameters such as iris or focus settings. This is illustrated in FIG. 9.

Figure 9:
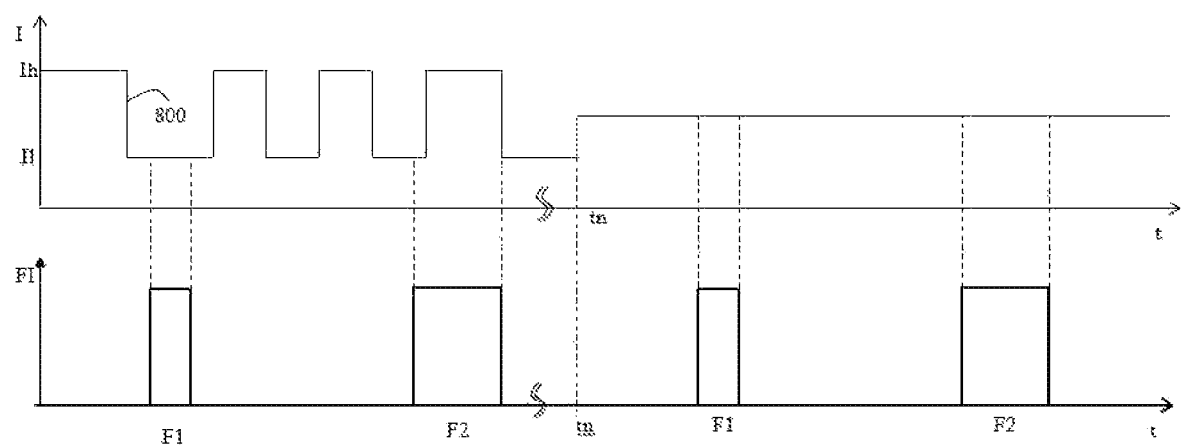
FIG. 9 illustrates the capturing of an image by a camera having a global shutter when an LED based light source is operating in pulsed mode and in continuous mode.

The top graph of FIG. 9 schematically shows the generated illumination intensity I before and after a notification signal was transmitted to an LED based light source at an instant tn. The bottom graph of FIG. 9 schematically illustrates the application of a first flash F1, which is used to set required parameters of the camera during the actual image capturing, the actual image capturing taking place during the second flash F2. Note that in practice, multiple flashes may be applied prior to the image capturing as well. The one or more flashes F1 are e.g. used to measure illumination conditions and derive the required parameters of the camera to be used during the actual image capturing. As such, the second flash F2 may e.g. be intensity and/or spectrum adjusted compared to the first flash F1. As can be seen, prior to the instant tn, the illumination conditions I during the first flash F1 are different from the illumination conditions during the second flash F2. In particular, the first flash F1 applied prior to tn is done when the illumination intensity I corresponds to Il, whereas the second flash F2 as applied prior to tn is done when the illumination intensity I is primarily equal to Ih, i.e. an intensity I that is higher than during the first flash F1. As a result, the capturing parameters as applied during the capturing of an image prior to tn may not have been optimal. In particular, the image as obtained may be too bright. In case a notification signal is applied prior to the application of the flash F1, the notification signal resulting in the LED based light source changing its operation from operating in a pulsed mode to operating in a continuous mode, the first flash F1 and the second flash F2 may occur in substantially the same illumination conditions, enabling a more accurate image capturing.

Note that, in general, the required capturing parameters may also be derived without the application of one or more first flashes F1, but rather based on measurements performed in an interval prior to the capturing. As will be understood by the skilled person, in case a modulating illumination is applied during said interval, the same issue as discussed above will arise.

In order to apply the modifications to the generated modulated light pattern as discussed above, it may be advantageous that the notification signal as emitted by the user device comprising the rolling shutter camera comprises rolling shutter operational data, e.g. the capturing rate or capturing duration or period of an image.

In accordance with an embodiment of the present invention, there is provided an LED driver that is configured, upon receipt of a notification signal as discussed above, to modify or adjust an operating characteristic of the LED driver, thereby modifying or adjusting an operating characteristic of an LED based light source that is powered by the LED driver.

It may be pointed out that the notification signal may be provided via various communication means available in the user device equipped with the camera, e.g. the rolling shutter camera. Similarly, the LED light source or more particular the LED driver of the LED light source may be equipped with various means of communication, either to receive or transmit messages such as notifications. It may also be pointed out that the communication between the LED light source and the user device may also occur indirectly, e.g. via a server connected to the LED driver. As an example, a user device may be equipped with Wifi communication means, whereas the LED driver of the LED based light source has a BLE connection connected to a server that is equipped with Wifi communication means. In such case, the LED driver may also transmit information to the user device, via the Wifi communication means of the server. A more direct approach could e.g. be to apply Bluetooth communication between the user device and the LED driver that is controlling the LED based light source.

Another manner to transmit the notification signal to the LED based light source would be to send the notification signal to the LED based light source as data encoded in the flashing of a flash light. In such embodiment, the LED driver controlling the light source may e.g. be equipped with a photosensor or the like to receive the flash light and to decode the notification signal from the received flash light.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A method of capturing an image of a scene using a user device having a rolling shutter camera, the scene being subjected to an illumination by an LED light source, the method comprising:
   receiving, by the user device, an illumination signal of the LED light source;
   establishing, by the user device, that the LED light source is operating in a visible light communication (VLC) mode;
   providing, by the user device, a notification signal to the LED light source, the notification signal being indicative of a capturing or imminent capturing of an image;
   adjusting, by the LED light source, an operating characteristic of the LED light source, based on the notification signal; and
   capturing, by the rolling shutter camera, the image of the scene, while the LED light source is operating at the adjusted operating characteristic.

2. The method according to claim 1, wherein adjusting an operating characteristic comprises an operating in an adjusted VLC mode or a constant current mode.

3. The method according to claim 2, wherein operating in the adjusted VLC mode comprises reducing a modulation depth of the VLC mode.

4. The method according to claim 1, wherein the step of capturing the image further comprises:
   providing, by the user device, a further notification signal to the LED light source, the further notification signal being configured to instruct the LED light source to resume operating with a previous operating characteristic.

5. The method according to claim 1, wherein the operating characteristic comprises a modulation depth of the VLC mode.

6. The method according to claim 1, wherein the notification signal comprises a light flash, generated by a light source of the user device.

7. The method according to claim 6, wherein the light flash comprises encoded data representing the notification signal and wherein the step of adjusting the operating characteristic is preceded by a step of decoding the light flash.

8. The method according to claim 1, wherein the notification signal comprises a Bluetooth signal or Wi-Fi signal generated by the user device.

9. The method according to claim 1, wherein the notification signal comprises rolling shutter operational data and wherein the LED light source is configured to control the operating characteristic based on the rolling shutter operational data.

10. The method according to claim 9, wherein the rolling shutter operational data comprises a capturing rate and/or capturing duration of the rolling shutter camera.

11. A method of capturing an image of a scene using a user device, the scene being subjected to an illumination by an LED light source, the method comprising:
    receiving, by the user device, an illumination signal of the LED light source;
    establishing, by the user device, that the LED light source is operating in a visible light communication (VLC) mode;
    providing, by the user device, a notification signal to the LED light source, the notification signal being indicative of a capturing or imminent capturing of an image;
    adjusting, by the LED light source, an operating characteristic of the LED light source, based on the notification signal; and
    capturing the image of the scene by the user device while the LED light source is operating at the adjusted operating characteristic.

12. The method according to claim 11, wherein the step of capturing the image comprises:
    applying, by the user device, a first light flash;
    setting an operating parameter of the user device; and
    applying, by the user device, a second light flash during the capturing of the image.

13. An LED driver for powering an LED based light source, the LED driver comprising:
    a power converter configured to convert a supply power to an output power for the LED based light source;
    a control unit configured to: receive an input signal representing a desired illumination;
    control the output power so as to generate the desired illumination, and to operate the LED based light source in a visible light communication (VLC) mode; and
    receive a notification signal from a user device, the notification signal indicative of a capturing or imminent capturing of an image;
    wherein the control unit is further configured to, upon receipt of the notification signal, adjust an operating characteristic of the power converter, at least during the capturing of the image, thereby operating the LED based light source at an adjusted illumination.

14. The LED driver according to claim 13, wherein the control unit is further configured to operate the power converter to generate a VLC mode output power and wherein the operating characteristic comprises a modulation depth of a VLC signal generated by the VLC mode output power.

15. The LED driver according to claim 14, the control unit is configured to reduce the modulation depth of the VLC signal, at least during the capturing of the image.

16. The LED driver according to claim 13, wherein the control unit is configured to adjust the operating characteristic of the power converter by operating the power converter in a continuous current mode, at least during the capturing of the image.

17. The LED driver according to claim 13, wherein an intensity and color of the adjusted illumination, as perceived by a human observer, substantially correspond to the intensity and color of the desired illumination.

18. The LED driver according to claim 13, wherein the control unit is further configured to operate the power converter such that an intensity and color of the adjusted illumination, as perceived by a human observer, substantially correspond to the intensity and color of the desired illumination.

19. The LED driver according to claim 13, wherein the user device comprises a rolling shutter camera.

20. The LED driver according to claim 19, wherein the notification signal comprises a capturing rate or capturing period of the rolling shutter camera and wherein the control unit is configured to adjust the operating characteristic of the power converter based on the capturing rate or capturing period.

21. The LED driver according to claim 13, wherein the control unit is configured to adjust the operating characteristic of the power converter during a predetermined period of time.

22. The LED driver according to claim 13, wherein the control unit is configured to adjust the operating characteristic of the power converter until a further notification signal is received.

23. The LED driver according to claim 13, further comprising a sensor configured to receive the notification signal.

24. The LED driver according to claim 23, wherein the sensor comprises a photosensor.

* * * * *